(12) United States Patent
Meier et al.

(10) Patent No.: US 12,434,571 B2
(45) Date of Patent: Oct. 7, 2025

(54) SYSTEM FOR AN ONBOARD NETWORK

(71) Applicant: AUDI AG, Ingolstadt (DE)

(72) Inventors: Christoph Meier, Eitensheim (DE); Maximilian Schiedermeier, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 12 days.

(21) Appl. No.: 18/355,276

(22) Filed: Jul. 19, 2023

(65) Prior Publication Data

US 2024/0025272 A1 Jan. 25, 2024

(30) Foreign Application Priority Data

Jul. 20, 2022 (DE) .......................... 102022118105.7

(51) Int. Cl.
*B60L 50/60* (2019.01)
*B60L 1/00* (2006.01)

(52) U.S. Cl.
CPC ................. *B60L 50/60* (2019.02); *B60L 1/00* (2013.01)

(58) Field of Classification Search
CPC .................................... B60L 50/60; B60L 1/00
USPC ......................................................... 307/9.1
See application file for complete search history.

(56) References Cited

U.S. PATENT DOCUMENTS

2023/0114063 A1* 4/2023 Iwasaki .................. H02M 7/48
363/13

FOREIGN PATENT DOCUMENTS

| DE | 102013205221 A1 | 9/2014 |
| DE | 102020102591 A1 | 8/2021 |
| DE | 102020118852 A1 | 1/2022 |
| DE | 102020118856 A1 | 1/2022 |
| EP | 1302371 A2 | 4/2003 |
| WO | 2018150010 A1 | 8/2018 |

OTHER PUBLICATIONS

EP 1302371 A2 (Year: 2003).*

* cited by examiner

*Primary Examiner* — Daniel Kessie
*Assistant Examiner* — Dru M Parries
(74) *Attorney, Agent, or Firm* — Seed Intellectual Property Law Group LLP

(57) ABSTRACT

A system is provided comprising an onboard network of a vehicle and an auxiliary converter, wherein the onboard network includes a first power supply, a second power supply, and a plurality of electric devices, wherein a second-voltage level of the second power supply is higher than a first-voltage level of the first power supply, wherein each of the electric devices includes at least one component, and wherein the at least one component of each of the electric devices is connected to the first power supply and is connected across the auxiliary converter to the second power supply.

7 Claims, 1 Drawing Sheet

SYSTEM FOR AN ONBOARD NETWORK

BACKGROUND

Technical Field

The disclosure relates to a system for an onboard network for a vehicle and a method for operating an onboard network of a vehicle.

Description of the Related Art

An onboard network of a vehicle is designed to supply at least one electric machine of the vehicle with electric energy.

Document WO 2018/150010 A1 describes an axle drive unit for an electrically powered motor vehicle.

Given this background, a challenge was to arrange components of an onboard network of a vehicle relative to each other.

BRIEF SUMMARY

The system according to the disclosure or a corresponding architecture is designed for an onboard network of a vehicle, such as a motor vehicle. The onboard network comprises an electric low-voltage power supply with and/or at a low-voltage level, an electric high-voltage power supply with and/or at a high-voltage level, and n or more electric devices, where n is a natural number, each of these n devices in turn comprising at least one usually electric and/or electronic component. The system or the architecture and/or a layout of the onboard network comprises an auxiliary electric converter, wherein the at least one component, i.e., only one component or multiple components in a respective device, optionally each component in the device, on the one hand, is connected redundantly, can be connected, or is to be connected usually directly to the low-voltage power supply and on the other hand across the auxiliary converter to the high-voltage power supply and thus to voltage power supplies at both voltage levels of the onboard network. It is thus possible to configure this system, usually at least the auxiliary converter, as part of the onboard network.

It is possible for the auxiliary converter to be configured as a self-standing component in the onboard network, whereby it is possible to arrange the auxiliary converter between a high-voltage battery of the onboard network and each of the components and thus for it to connect each of the components indirectly to the high-voltage battery. An electronics of the high-voltage battery, for example, can be associated with or arranged at the auxiliary converter of the high-voltage battery (HV-battery). Furthermore, the auxiliary converter can be associated with or arranged at a pulse inverter or an onboard network converter as the respective device of the onboard network. Moreover, the auxiliary converter can be designed as a separate component of the onboard network between the high-voltage battery and the components, such as microcontrollers, and/or devices of the onboard network.

In one embodiment it is moreover possible for the auxiliary converter to be arranged or integrated in the high-voltage battery of the onboard network, e.g., in the electronics of the high-voltage battery for the onboard network or the onboard network. Thus, no additional external component and therefore also no additional connection, such as a high-voltage connection, is needed to connect the auxiliary converter to the high-voltage battery. It is furthermore possible for the auxiliary converter to be arranged or integrated in the pulse inverter or in the onboard network converter as the respective device of the onboard network.

If a further component of the onboard network is arranged between the high-voltage battery and each device having a component, it is possible for the auxiliary converter to be associated with this component, for example to be arranged or integrated in it. If the auxiliary converter is associated with and/or arranged in the onboard network converter as a component between the high-voltage battery and the components, such as microcontrollers, in the devices, it is possible to connect a topology of the auxiliary converter to a topology of the onboard network converter. The auxiliary converter can be associated with a respective component, especially a high-voltage component, of the onboard network and also be integrated in it. Usually, multiple voltage converters can be arranged in a pulse inverter. In one embodiment of the system, it is possible to associate the auxiliary converter or a small HVLV-converter for example with a pulse inverter (PWR) as the device of the onboard network and to integrate it in this pulse inverter. If the onboard network comprises multiple pulse inverters, the auxiliary converter is provided or integrated in only one, for example a first pulse inverter. All the other pulse inverters have only customary voltage converters. It is possible to connect a component in the first pulse inverter across the auxiliary converter to the high-voltage power supply. A component in another, second pulse inverter is connected across a line to the auxiliary converter in the first pulse inverter and across the latter to the high-voltage power supply.

In another embodiment, it is furthermore possible for the auxiliary converter to be associated with at least one protective switch, such as a contactor or switching contactor, and for the auxiliary converter to be connected across the at least one protective switch to the at least one component, usually to all components. The voltage for the respective component can also be picked off, for example, behind the at least one protective switch, so that a greater availability of the auxiliary converter could be achieved.

It is possible for the high-voltage battery or a high-voltage cell to be connected across contactors to high-voltage components and to the auxiliary converter of the onboard network, it being possible to disconnect the high-voltage battery via the contactors from said components of the onboard network. The auxiliary converter can be arranged between the high-voltage battery and at least one contactor, i.e., behind the at least one contactor, or between the at least one contactor and other components of the onboard network. In the arrangement between the high-voltage battery and the at least one contactor, the connection between the high-voltage battery and the auxiliary converter will remain even with opened contactor, if the contactors are open, so that a greater availability of the auxiliary converter can be achieved.

It is possible for at least one usually electronic component in at least one electric device to be configured or designated as a computing core for data processing, for example as a microcontroller (µC), as a usually programmable logic component, as a driver component and/or as a computer chip.

Moreover, it is possible for at least one electric device in which a component is arranged or integrated to be configured as a pulse inverter (PWR), where furthermore such an electric device connects the high-voltage battery to an electric machine for the driving or propulsion of the vehicle. The onboard network converter can be configured or designated as a DC voltage-DC voltage converter or DCDC or direct current-direct current converter for different voltage levels and/or current levels. It is also possible for the onboard network converter to be configured or designated as a power converter. Both the auxiliary converter and the onboard network converter are configured to convert at least one electrical parameter, i.e., an electrical voltage and/or an electrical current, between different levels, i.e., voltage levels and/or current levels, or corresponding different levels, i.e., voltage and/or current levels, of a particular electrical parameter.

The method according to the disclosure is provided for operating an onboard network of a vehicle and thus also for operating the vehicle, wherein the onboard network comprises a low-voltage power supply, a high-voltage power supply, and n or more electric devices, each of these n devices comprising at least one usually electronic component, i.e., only one electronic component or multiple electronic components. In the method or for its implementation the at least one component, i.e., only one component or multiple components, is connected on the one hand directly, i.e., by one line in any case, to the low-voltage power supply and on the other hand across an auxiliary converter, in one embodiment a common auxiliary converter for all the components, and usually also by an additional line, to the high-voltage power supply.

The electric energy is provided to each component, starting from the low-voltage power supply for which a low-voltage level is provided, having a voltage value at or with largely unchanged low-voltage level, the voltage value starting from the low-voltage level being usually slightly variable but remaining largely unchanged, depending on an electrical resistance of the line between the low-voltage power supply and the component or other effects occurring during the transport of electric current. On the other hand, the electric energy of and/or from the high-voltage power supply having a voltage value corresponding to a high-voltage level, is converted starting from a high-voltage level by the auxiliary converter for each component to the low-voltage level, it being also conceivable here for a respective voltage value to vary slightly on account of the transport of the electric current in the context of the usual operating manner of the onboard network. The respective voltage level is dependent on the components, i.e., the consumers or electric components, as well as their design.

In one possible embodiment of the method, it is provided that the at least one component, optionally every component, has the low-voltage level according to the low-voltage power supply and/or can be operated at the low-voltage level, while the at least one component is or can be connected to two voltage power supplies, i.e., to a low-voltage battery or a corresponding low-voltage cell as the low-voltage power supply or low-voltage source and redundantly across the auxiliary converter to a high-voltage battery or a corresponding high-voltage cell as the high-voltage power supply or the high-voltage source, for which the high-voltage level is provided, being higher than the low-voltage level. Electric energy from the high-voltage battery is converted or transformed from the high-voltage level to the low-voltage level and provided to the respective component for the energy power supply. It is possible for the at least one component to be supplied redundantly with electric energy from or by two different and/or independent batteries, i.e., the high-voltage and the low-voltage battery, as electric power sources or energy storages. The high-voltage power supply or source can be designed as a high-voltage battery and/or as a fuel cell of the vehicle. Alternatively or additionally, the high-voltage power supply or source can comprise the high-voltage battery and/or the fuel cell. In one possible embodiment of the method, the at least one component is connected across the auxiliary converter to the high-voltage battery and/or the fuel cell.

In one embodiment, a respective electric device, comprising the at least one component, connects each time an electric machine, where each electric machine is associated with at least one driving wheel of the vehicle, such as an electric vehicle or hybrid vehicle, to the high-voltage battery, which can also be designed or designated as a traction battery of the vehicle. During the operation of the onboard network and the electric machines, a first large portion of the electric energy from the high-voltage battery is provided to the respective electric machine across the respective electric device.

Furthermore, it is possible in one embodiment for a second smaller portion of the electric energy from the high-voltage battery, after having been transformed by the auxiliary converter from the high-voltage level to the low-voltage level, to be provided to the at least one component of the device, to which further electric energy from the low-voltage battery can be provided additionally and redundantly, so that the at least one component can be supplied redundantly from two batteries, i.e., the high-voltage battery with a high-voltage level of around 400 V to 800 V, for example, and the low-voltage battery with a smaller low-voltage level of 12 V, for example, as the energy sources. If the at least one component is designed, e.g., as a microcontroller and/or as a usually programmable logic element for the respective device, a redundant electric energy power supply can be provided for this microcontroller or this logic element for the control of the device with the system. The at least one electronic and/or electric component among multiple electronic and/or electric components distributed among multiple devices as consumers of the onboard network, can be redundantly supplied with electric energy, so that a failure of a particular electronic component can be prevented. Furthermore, it is possible to easily adapt the auxiliary converter to each of the two voltage levels or voltage ranges provided in the onboard network, if at least one of these voltage levels is or should be changed. On the whole, only one auxiliary converter is provided for all the microcontrollers. Thus, multiple voltage converters are not necessary, i.e., each time one voltage converter for one microcontroller.

Of course, the features mentioned above and those yet to be explained below can be used not only in the particular indicated combination, but also in other combinations or standing alone, without leaving the scope of the present disclosure.

BRIEF DESCRIPTION OF THE SEVERAL VIEWS OF THE DRAWINGS

The disclosure is represented schematically with the aid of embodiments in the drawing and shall be described schematically and at length with reference to the drawing.

The figures are described consistently with reference to each other. The same reference numbers are assigned to the same components.

DETAILED DESCRIPTION

Figure 1:
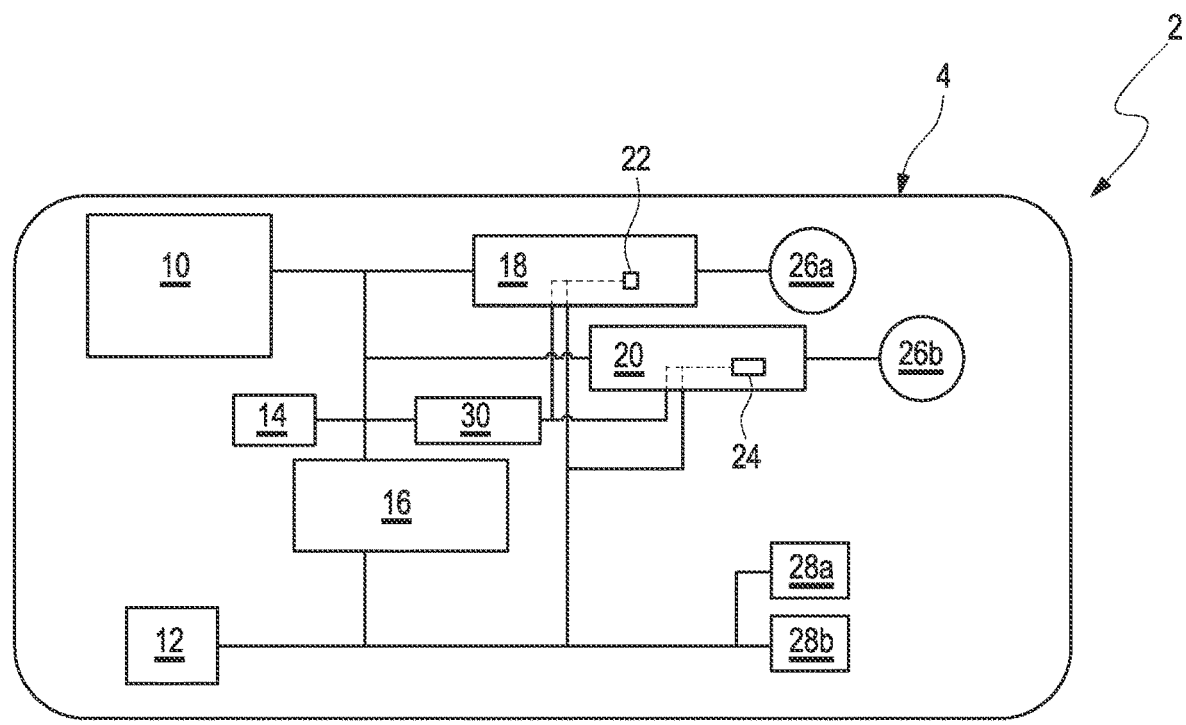
FIG. 1 shows in schematic representation a first embodiment of the system according to the disclosure for a first example of an onboard network of a vehicle.
Figure 2:
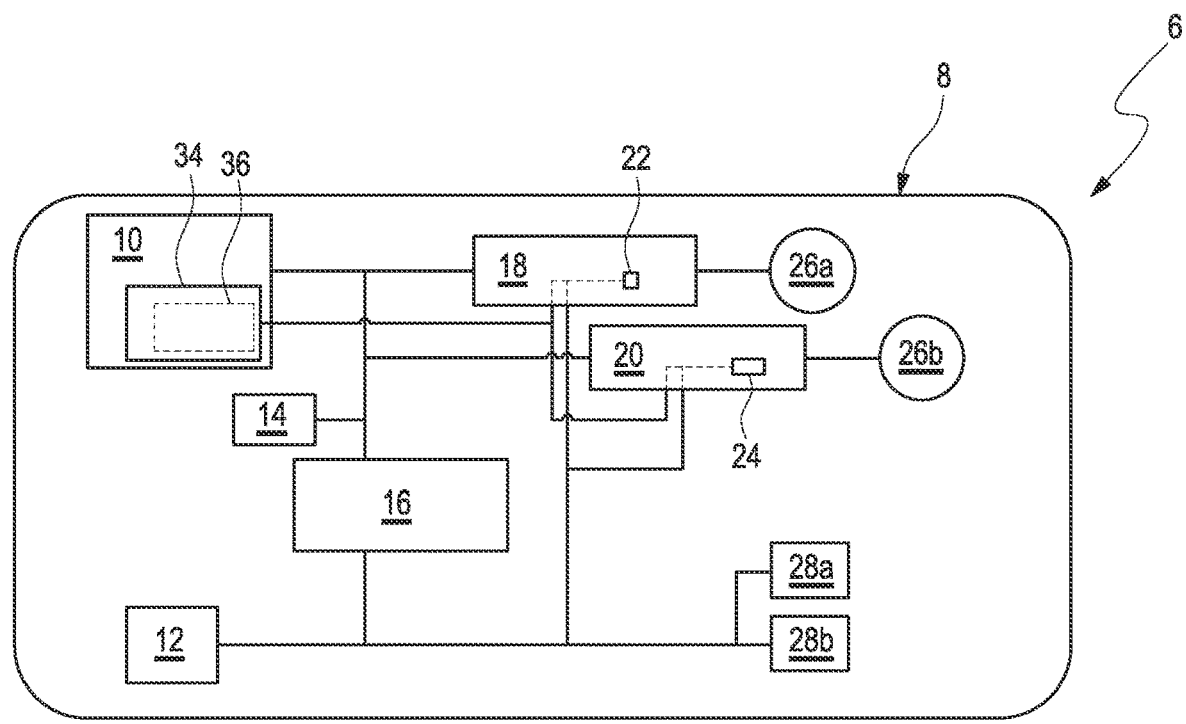
FIG. 2 shows in schematic representation a second embodiment of the system according to the disclosure for a second example of an onboard network of a vehicle.

Each embodiment of the system according to the disclosure shown schematically with the aid of FIGS. 1 and 2 is designed for an onboard network 4, 8 of a vehicle 2, 6, here, a motor vehicle, and for carrying out an embodiment of the method according to the disclosure.

Each onboard network 4, 8 and thus each vehicle 2, 6 comprises, as their electric energy sources, a high-voltage battery 10 as the high-voltage power supply, having a high-voltage level, and a low-voltage battery 12 as the low-voltage power supply, having a low-voltage level. Furthermore, each onboard network 4, 8 comprises multiple consumers or users, here, at least one high-voltage consumer 14 at the high-voltage level, at least one low-voltage consumer 28a, 28b at the low-voltage level, a power converter or onboard network converter 16, and as the electric device a first pulse inverter 18 and an n-th pulse inverter 20.

Each device and thus each pulse inverter comprises here a μC or microcontroller as the electronic component 22, 24, which is located at the low-voltage level and is supplied with electric energy from the low-voltage power supply.

Furthermore, it is provided that the onboard network converter 16 connects components of the onboard network 4, 8, having the high-voltage level as a high voltage level and forming a first partial network of the onboard network 4, 8 at the high-voltage level, and components of the onboard network 4, 8, having the low-voltage level as a low voltage level and forming a second partial network of the onboard network 4, 8 located at the low-voltage level, and it is adapted to convert or transform an electric voltage of the onboard network 4, 8 between the two voltage levels provided.

It is provided each time that the high-voltage battery 10 is connected across the first pulse inverter 18 to a first electric machine 26a and across the n-th pulse inverter 20 to an n-th electric machine 26b of the vehicle 2, 6. During the operation of the vehicle 2, 6, electric energy is provided from the high-voltage battery 10 across a respective pulse inverter 18, 20 to a respective electric machine 26a, 26b, which transforms the electric energy in a motor operating mode into mechanical energy for the propulsion of the vehicle 2, 6. It is also possible to convert mechanical energy of the moving vehicle 2, 6 in a generator operating mode of the respective electric machine 26a, 26b, usually during a recuperation, into electric energy, which is provided to the high-voltage battery 10 across the respective pulse inverter 18, 20 and stored therein. Lines connecting the described components of the onboard network 4, 8 and/or the vehicle 2, 6 are shown schematically in FIGS. 1 and 2 as lines between the respective components, the electric energy being carried by the lines between the components.

The electric energy during each operating mode is carried by the respective pulse inverter 18, 20 between the high-voltage battery 10 and the electric machine 26a, 26b and is thus controlled by the respective electronic component 22, 24, usually being controlled and/or regulated, monitored and adjusted.

Both the first embodiment of the system according to the disclosure for the onboard network 4 from FIG. 1 and the second embodiment of the system according to the disclosure for the onboard network 8 from FIG. 2 encompass an auxiliary converter 30, 36.

In the case of the first embodiment of the system, the auxiliary converter 30 is connected on the one hand by a line to the high-voltage power supply, here, the high-voltage battery 10, of the onboard network 4 and on the other hand by a line to a component 22, 24 in a respective pulse inverter 18, 20. This auxiliary converter 30 is designed here as a separate, independent component or a corresponding structural unit.

In the case of the second embodiment of the system, the auxiliary converter 36 is integrated or arranged in the high-voltage battery 10, e.g., in a terminal box 34 or a battery junction box (BJB) as electronics of the high-voltage battery 10 and is thus also connected on the one hand to the high-voltage battery 10. On the other hand, this auxiliary converter 36 is connected by a line to a component 22, 24 in a respective pulse inverter 18, 20.

Furthermore, in both embodiments of the system each component 22, 24 is connected by a further line to the low-voltage battery 12.

In both embodiments of the method according to the disclosure, which is carried out respectively with an embodiment of the proposed system, each component 22, 24 can be supplied with electric energy from both batteries, i.e., supplied redundantly, such as also arbitrarily with electric energy from both the high-voltage battery 10 and the low-voltage battery 12, the electric energy of the high-voltage battery 10 as the high-voltage power supply at one input of the auxiliary converter 30, 36 being converted or transformed by the auxiliary converter 30, 36 from the high-voltage level to the low-voltage level for the respective component 22, 24 and provided to this component 22, 24 at an output of the auxiliary converter 30, 36 for the low-voltage power supply. The electric energy from the low-voltage battery 12 is provided generally unchanged to the component 22, 24 from the low-voltage power supply. If different components 22, 24 in a respective pulse inverter 18, 20 should have different low-voltage levels, it is possible to arrange a further extra converter along a line between the auxiliary converter 30, 36 and the component 22, 24, which is adapted to adjust the voltage level, i.e., the low-voltage level, more accurately, i.e., specifically, for the respective component 22, 24.

With a particular embodiment of the system and/or the method for the respective onboard network 4, 8 it is possible to dimension it economically and to reduce the development expense for the auxiliary converter 30, 36, since only one such auxiliary converter 30, 36 is required, and thus an electric converter which is smaller than the onboard network converter 16, for all the components 22, 24. It is possible to adapt the respective auxiliary converter 30, 36 of each onboard network 4, 8 to voltage levels or voltage ranges, between which electric voltage is converted by it, usually also in quantitative manner.

German patent application no. 102022118105.7, filed Jul. 20, 2022, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A system comprising:
an onboard network of a vehicle; and
an auxiliary converter,
wherein the onboard network includes:
a first battery that, in operation, supplies a first voltage level;
a second battery that, in operation, supplies a second voltage level; and
a plurality of electric devices, wherein the second voltage level supplied by the second battery is higher than the first voltage level supplied by the first battery;

wherein the auxiliary converter, in operation, converts the second voltage level supplied by the second battery to the first voltage level, and supplies the first voltage level;

wherein each of the electric devices is connected to the second battery, and is provided with the second voltage level supplied by the second battery;

wherein each of the electric devices includes at least one component; and wherein the at least one component of each of the electric devices is connected to the first battery and is provided with the first voltage level supplied by the first battery, and is separately connected to the auxiliary converter and is provided with the first voltage level supplied by the auxiliary converter.

2. The system according to claim 1, wherein the auxiliary converter is an independent component in the onboard network.

3. The system according to claim 1, wherein one of the electric devices of the onboard network is a pulse inverter, and wherein the auxiliary converter is situated at or in the pulse inverter.

4. The system according to claim 1, wherein the auxiliary converter is situated at or in a battery for the onboard network.

5. The system according to claim 1, wherein the at least one component of one of the electric devices is a microcontroller, a logic component, or a driver component.

6. A method for operating an onboard network of a vehicle, the onboard network including a first battery that supplies a first voltage level, a second battery that supplies a second voltage level, and a plurality of electric devices, the second voltage level supplied by the second battery being higher than the first voltage level supplied by the first battery, each of the electric devices being connected to the second battery and provided with the second voltage level supplied by the second battery, each of the electric devices including at least one component, the method comprising:

connecting the at least one component of each of the electric devices to the first battery;

providing the first voltage level supplied by the first battery to the at least one component of each of the electric devices;

connecting the at least one component of each of the electric devices to an auxiliary converter that converts the second voltage level supplied by the second battery to the first voltage level, and supplies the first voltage level; and providing the first voltage level supplied by the auxiliary converter separately from the first battery to the at least one component of each of the electric devices.

7. The method according to claim 6, wherein the at least one component of one of the electric devices has the first voltage level, wherein the at least one component of the one of the electric devices is connected to the first battery across the auxiliary converter to the second battery, and wherein the method includes:

converting electric energy from the second battery from the second voltage level to the first voltage level; and providing the electric energy having the first voltage level to the at least one component of the one of the electric devices.

* * * * *